United States Patent [19]

Ross

[11] 4,163,194
[45] Jul. 31, 1979

[54] VOLTAGE-CURRENT-POWER METER FOR PHOTOVOLTAIC SOLAR ARRAYS

[75] Inventor: Ronald G. Ross, La Canada, Calif.

[73] Assignee: California Institute of Technology, Pasadena, Calif.

[21] Appl. No.: 818,122

[22] Filed: Jul. 22, 1977

[51] Int. Cl.$^2$ ............................................. G01N 27/42
[52] U.S. Cl. ..................................... 324/29.5; 320/48; 324/73 R
[58] Field of Search ............... 324/29.5, 73 R, 73 AT, 324/113; 320/48

[56] References Cited

U.S. PATENT DOCUMENTS

| | | | |
|---|---|---|---|
| 3,778,702 | 12/1973 | Finger | 324/29.5 |
| 3,969,667 | 7/1976 | McWilliams | 324/29.5 |
| 4,021,718 | 5/1977 | Konrad | 324/29.5 |

*Primary Examiner*—M. Tokar
*Attorney, Agent, or Firm*—Freilich, Hornbaker, Wasserman, Rosen & Fernandez

[57] ABSTRACT

A meter is disclosed for measuring the voltage, current, and power (VIP) parameters of a photovoltaic solar array, or array module, under sunlight operating conditions utilizing a variable load connected across the array and controlled by a voltage regulator which responds to the difference between the output voltage of the array and a programmed test voltage from a source which generates a single ramp voltage for measuring and recording current as a function of voltage, repeated ramp voltages at a high rate for peak output measurements or a DC voltage for VIP measurements at selected points on the I-V characteristic curve of the array. The voltage signal from a current sensing element, such as a shunt resistor in series with the variable load, is compared with the output current of a reference solar cell to provide a normalizing signal to be added to the signal from the current-sensing element in order to provide a record of array current as a function of array voltage, i.e., for all load conditions from short circuit to open circuit. As the normalized current is thus measured, an analog multiplier multiplies the array voltage and normalized current to provide a measurement of power. Switches are provided to selectively connect the power, P, current, I, or voltage, V, to a meter, directly or through a peak detector. At the same time any one of the parameters V, I and P may be recorded as a function of any other parameter.

12 Claims, 4 Drawing Figures

VOLTAGE-CURRENT-POWER METER FOR PHOTOVOLTAIC SOLAR ARRAYS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

BACKGROUND OF THE INVENTION

This invention relates to a voltage (V), current (I), and power (P) meter for solar arrays of photovoltaic cells.

Photovoltaic cells designed to convert solar energy into electrical energy have been developed sufficiently for commercial use in only special applications where other commercial power sources are not readily available, such as on oil platforms and at microwave relay stations on top of mountain peaks. This is due primarily to the present high cost of the solar cells. Consequently, the only places where solar arrays are cost effective are places where an unattended source of power is required, namely the most difficult places in the world to reach.

Evaluation of array performance and diagnosis of faulty solar cell modules requires compact portable instrumentation for measuring array output voltage, current and power (VIP) characteristics. Instrumentation is not available that is sufficiently portable for a technician to check the VIP characteristics of an array under remote field operating conditions.

A solar cell is essentially a diode, and if a large number of such cells are connected together in an array, the array characteristics look very much like the diode characteristics. The level of short circuit current remains substantially constant as output voltage across a load increases toward an open circuit until a region is reached known as the "knee" of the characteristic curve. There current begins to drop, and the rate of drop increases very rapidly at levels very near the maximum output voltage of the array.

The I-V characteristic of a solar array will degrade in different ways due to different defects which develop in the array through normal use. For example, the cells of the array are normally encapsulated in highly transparent material, but the transparency of the material degrades with age due to yellowing of the material itself and the accumulation of dust on its surface. This type of degradation decreases the short circuit current of the array, i.e., decreases the current amplitude of the I-V characteristic. This is because the short circuit current characteristic of the array is essentially of precise linear dependence on solar intensity. This is well recognized; in fact, solar cells are used individually or in small arrays in commercial light meters.

Another type of degradation of an array manifests itself as an increased series resistance in the array which causes the current to decrease earlier and faster as the load voltage across the array is increased. This is commonly referred to as "softening of the knee" which is readily apparent in a plot of the I-V characteristic by the collapse of the normal well-defined knee of the characteristic inwardly towards the origin of the I-V graph. The extent to which the knee collapses due to this type of degradation is commonly referred to as the "fill factor" of the array. The fill factor, which is thus a measure of the softening of the knee, is an indication that there is some increased series resistance taking place in the array.

Other types of degradation of an array cause other particular changes in its I-V characteristic. Consequently, it is desirable to measure the I-V characteristic of an array under operating conditions in the field of determine the nature and extent of its degradation in order that proper steps can be taken to maintain the array operating at, or very near, its design I-V characteristic.

To measure the I-V characteristic of an array in the field, it is very important that the current and voltage measurements be made relative to a known solar radiation level, because obviously the array electrical output is dependent on the radiation received at the moment of the measurement. In addition to an accurate measurement of short circuit current at a known solar intensity it is also necessary to measure with accuracy the maximum power output which occurs at the center of the knee of the I-V characteristic, because many types of degradations will manifest themselves only in degradation of the maximum power point. Consequently, to test a solar cell under operating conditions it is necessary to measure the performance of the solar array under a full range of load conditions including conditions at precisely its maximum power point. There is a major problem in measuring performance of a solar array at its maximum power point.

The maximum power point of a solar array is usually measured by adjusting the output of the array using a variable power supply to buck the array output from its maximum voltage output down through the maximum power point in the knee of the I-V characteristic curve. Alternatively, it would be possible to connect a large potentiometer across the array to plot the I-V characteristic curve from its maximum voltage output at open circuit through the knee of the curve to the short circuit current measurement, but since the I-V characteristics are different for different sizes and arrangements of the arrays, it would require a different size potentiometer for the different arrays in order to dissipate the different amounts of power of the arrays while making the I-V characteristic measurements. To avoid having so many different potentiometers, it is more common practice to use a bucking power supply, but it is only feasible to do that in a laboratory, and not in the field, becase it is not feasible to attempt to build a portable instrument with some kind of large power supply (typically 500 to 1000 watts) to match the power out of the solar array if the portable instrument is itself to be powered by storage batteries.

The need for a light portable instrument to make I-V characteristic measurements of an array and to plot the actual I-V characteristic curve itself for array degradation analysis in the field, has become a problem because solar array installations are being made in locations accessible only on foot, or from a hovering helicopter. To test solar cells in those locations, the technician must have a very portable VIP meter. This need for a very portable meter will increase as solar arrays come into more widespread use because, as noted hereinbefore, they are most cost effective in the worst possible places to get to, namely places where unattended power supplies are required such as on oil platforms in the middle of a swamp, towers on mountain peaks, or towers in the middle of a desert.

SUMMARY OF THE INVENTION

In accordance with the present invention, a portable instrument for measuring the voltage, current and power parameters of a photovoltaic solar array is comprised of a variable load connected across the array and regulated by an electronic means thereby controlling the voltage and current output of the array over the full range from substantially short circuit current to open circuit. The voltage at the output of the array and the signal voltage from a current sensing element represent the voltage and current parameters, respectively, at V and I terminals connected to a recorder, and connected to an electronic multiplier, the output of which provides power measurements at a third terminal P. The terminals V, I and P may be selectively connected to a peak detector and meter. A voltage generator produces a selected program voltage for control of the variable load to cause outputs at the V and I output terminals to sweep the full range between open and short circuit conditions once at a controlled rate for recording the current I as a function of output voltage V, or repeatedly at a faster rate for detecting peak power through the peak detector connected to the terminal P. A DC program voltage may also be generated at selected levels to permit measurement of V, I and/or P at selected points on the I-V characteristic curve of the array. A reference cell is connected to normalizing means for appropriately scaling the current at the current output terminal I so as to provide a current measurement that corresponds to an array output (voltage and current) at a standard insolation level, such as 100 mW/cm$^2$. All I and P measurements made are continuously normalized to the reference insolation level to eliminate the effect of time variations in the in situ insolation level.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
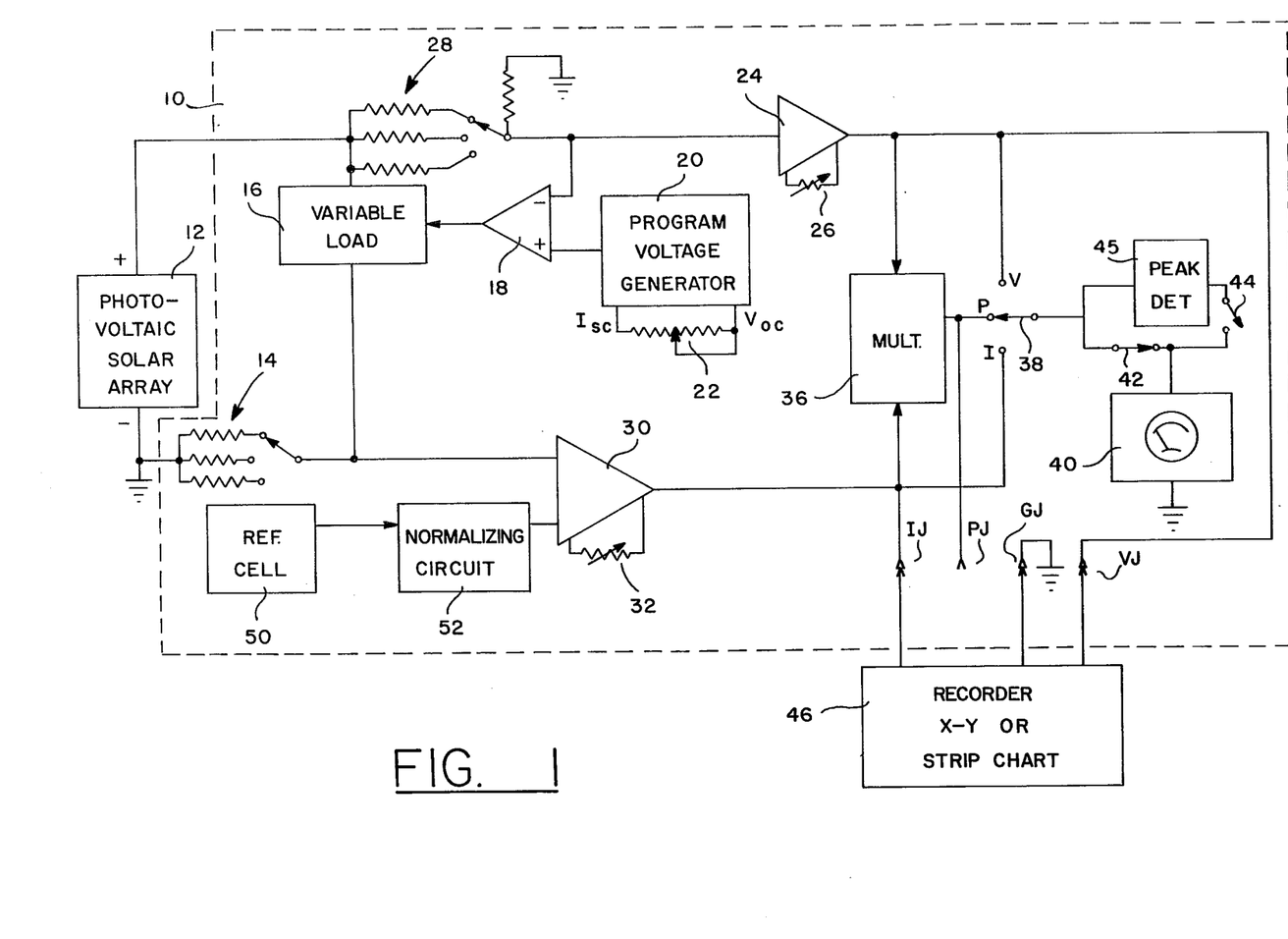
FIG. 1 is a block diagram of the invention.

Referring now to the drawings, FIG. 1 illustrates the organization of a VIP meter 10 according to the present invention. The VIP meter is capable of measuring electrical performance characteristics in situ for any array 12 within the specifications for which the meter is designed, such as the following:

Open circuit voltage: $2 < V_{oc} < 50$ volts
Short circuit current: $0.1 < I_{sc} < 10$ amp.
Maximum power output: $0.5 < P_{max} < 500$ watts
Accuracy:
  V and $V_{oc} \pm 2\%$
  I and $I_{sc} \pm 2\%$
  P and $P_{max} \pm 3\%$
  Where V, I and P are array parameters at other than the special conditions for $V_{oc}$, $I_{sc}$ and $P_{max}$.

The meter is adapted to be connected across the array, as by conventional clips and insulated leads, to place a selectable current-sensing element 14 and variable load 16 in parallel with the array. The variable load may be a large power transistor, or a plurality of power transistors in parallel, connected between the output terminal of the array and the current-sensing element, but preferably the variable load is implemented by a pair of transistors connected in a double-emitter follower (or $\beta$ multiplier) configuration as is well known in the art and commonly referred to as a Darlington pair. The configuration consists of connecting the collectors of two transistors together, and the emitter of one (the control input transistor) to the base of the other. The emitter of the other transistor is then the output terminal. Current between the common collectors and the emitter of the other transistor is controlled by the input current to the base of the control input transistor.

The input signal for control of the variable load 16 is derived from a feedback operational amplifier 18 connected to the output of the array for closed-loop stabilization of the variable load. In practice, the power transistors are inverting amplifiers and therefore require that the non-inverting input terminal (+) of the feedback amplifier be used for the closed loop, but in this functional block diagram we assume no polarity inversion in the loop across the variable load so that the inverting input (−) of the amplifier is indicated as being connected in the loop for degenerative feedback; otherwise regenerative feedback would occur. The other terminal of the amplifier 18 receives a program voltage signal from a generator 20.

The program voltage from the generator 20 is added to the stabilizing feedback in the amplifier 18 to offset the stabilized point of operation from 0 to $V_{oc}$. This is accomplished by generating a voltage that is either (1) a DC offset manually selected by a potentiometer 22, (2) a linearly changing voltage to sweep the meter from about $V \sim 0.6$ volts for measurement of short circuit current, $I_{sc}$, to open circuit voltage, $V_{oc}$, at a slow rate, such as 5 or 10 seconds, or (3) an oscillating signal to repeatedly vary the array about between short circuit and open circuit at a fast rate in order to obtain an AC output for peak detection of parameters V, P and I.

The parameter V, output voltage, is available at a jack identified by the letters VJ in the drawing. That jack is coupled to the array output terminal by an operational amplifier 24 having a feedback potentiometer 26 for voltage gain adjustment of the meter, and a bank 28 of selectable coupling resistors for voltage range selection of the meter.

The current through the selectable current sensing element 14 provides a voltage signal that is proportional to current. That signal is coupled to an array current output jack IJ by an operational amplifier 30 having a feedback potentiometer 32 for gain control.

Both output jacks, VJ and IJ, are connected directly to an electronic multiplier 36 which produces as a product a measurement of solar array power, P=IV. The output of the multiplier is connected to an output jack PJ. All three jacks are connected directly to three terminals, V, I and P, of a selector switch 38 used to select for measurement on a meter 40 any of the three parameters when a switch 42 is in the position shown, or the peak of any of the three parameters when the switch 42 is in its alternate position. A switch 44 is ganged with the switch 42 so that when it is in its alternate position, the switch 44 is closed to place a peak detector 45 in the circuit of meter 40 to measure peak voltage current or power.

Any of the three parameters may be recorded on an X-Y or strip chart recorder 46 while the switches 42 and 44 are in either position. Normally the parameters I and V are recorded to plot the I-V characteristic of the array, but sometimes it may be the parameters P and V. In either case, it is desirable to scan from short circuit current, $I_{sc}$, to open circuit voltage, $V_{oc}$, operation. That is accomplished by momentarily closing a sweep switch which triggers one cycle of a ramp voltage in the generator 20 to cause the output voltage, V, to drop to about 0.6 volts (for a virtual short circuit across the variable load 16) and increase linearly to $V_{oc}$ for a virtual open circuit across the variable load 16. The result is that in the course of the ramp voltage sweep, the complete I-V, or P-V characteristic is recorded. The sweep time is controlled (5 to 10 seconds) for the operating speed of the recorder.

Since recording the I-V characteristic may take as much as 10 seconds, it is recognized that there can occur in that interval variations in the intensity of solar radiation due to waves or moisture, dust, etc., in the air. Although such variations are not norrmally detectable by the human eye due to image persistence in the eye, they will significantly affect the solar array output, and thus introduce noise in the P and I measurements. In order to normalize the measurements to a known solar intensity, a reference solar cell 50 is connected to the amplifier 30 through a normalizing circuit 52 that provides a corrective offset to amplifier 30 as a function of solar radiation detected by the reference cell.

Since the fluctuations in radiation can occur during an I-V measurement, it would be impossible to continually adjust for normalization by manual means. Consequently, the circuit 52 is designed so that after an initial calibration adjustment the amplifier offset is continually adjusted automatically for accurate normalization during measurements.

Figure 2:
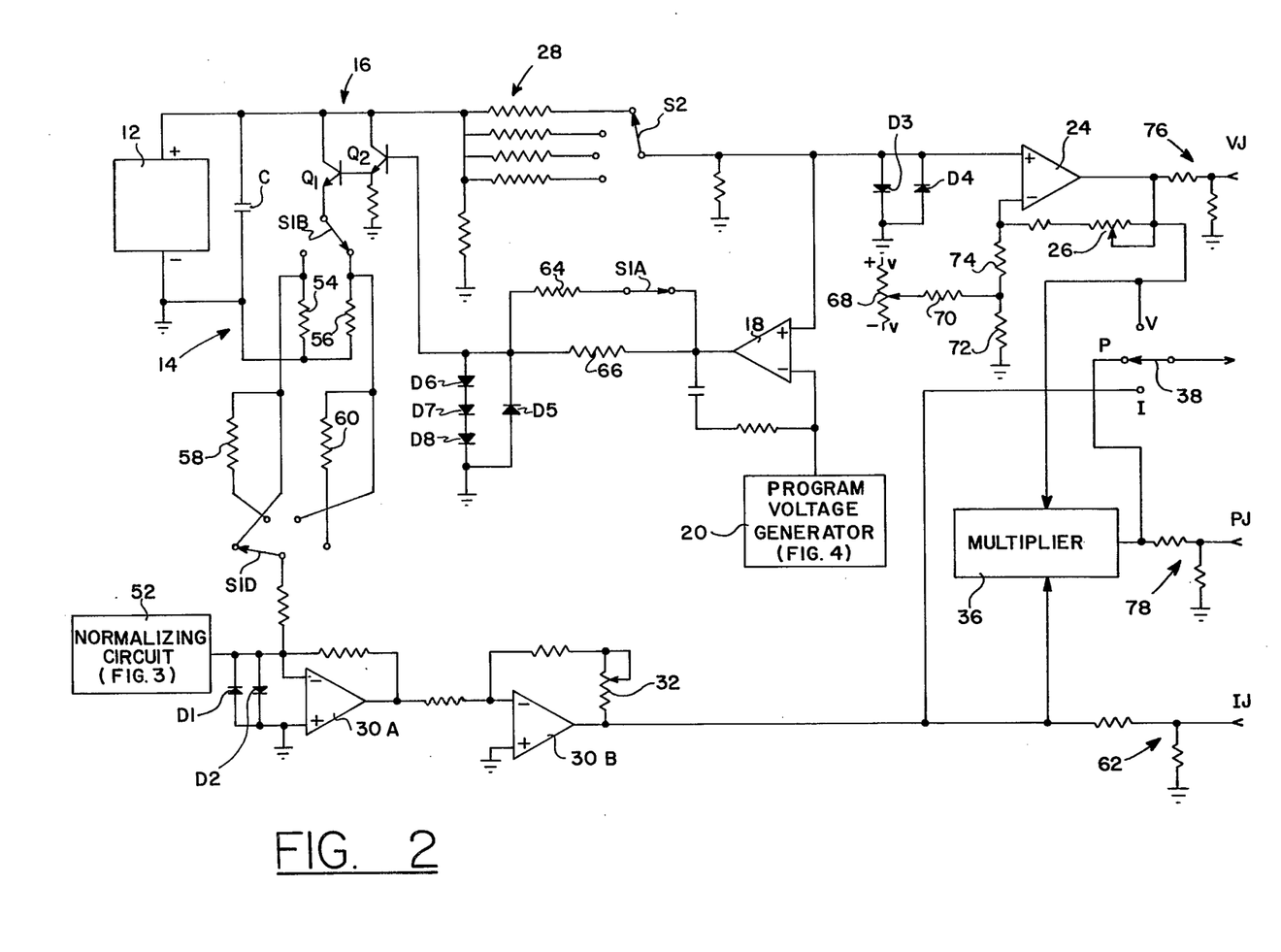
FIG. 2 is a circuit diagram of a preferred embodiment.

Referring now to FIG. 2, the preferred embodiment is shown using a pair of transistors $Q_1$ and $Q_2$ in a Darlington configuration with two current-sensing elements (resistors) 54 and 56, either of which may be connected through a switch S1B. The element 54 is selected for high current levels (5 amps) and the element 56 is selected for low current levels (0.5 amps).

The voltage signal across the selected current-sensing element is coupled to an operational amplifier 30A which, together with an operational amplifier 30B, performs the function of the operational amplifier 30 of FIG. 1. A switch S1D is employed to selectively connect the element 54, either directly or through a resistor 58, and to connect the element 56 either directly or through a resistor 60 in order to scale the input to the operational amplifier 30A.

That arrangement is thus equivalent to that shown in FIG. 1 for placing a selectable current-sensing element 14 in series with the variable load 16. Consequently, the reference numerals 14 and 16 are employed in FIG. 2 to indicate generally the equivalence. Other reference numerals appearing in FIG. 2 which correlate directly with elements or functional blocks shown in FIG. 1 are employed in FIG. 2 to indicate that direct correlation. Differences in this preferred embodiment vis-à-vis the configuration of FIG. 1 are obvious to those skilled in the art. Additional circuit elements are included in the preferred embodiment for obvious and conventional purposes, such as the limiting diodes D1 and D2 at the input of the operational amplifier 30A to assure that the operational limits of the amplifier 30A are not exceeded. The output of the operational amplifier 30B is then applied to the multiplier 36 and to the terminal I of the switch 38 directly, and through a current-limiting resistor network 62 to the jack IJ for connection of the recorder 46 (FIG. 1).

The chosen voltage output of the solar array 12 is coupled to the operational amplifier 24 through the bank of selectable coupling resistors 28 by a switch S2. Limiting diodes D3 and D4 assures that the signal applied does not exceed the operational limits of the amplifier. The input of the amplifier is also directly connected to the operational amplifier 18 where the output of the program voltage generator 20 is added to the stabilizing negative feedback applied to the variable load. Since the variable load is comprised of transistors which effectively provide signal inversion between the base and collectors, the negative feedback through the operational amplifier 18 is through the noninverting (+) input terminal of that amplifier. The output of the programmed voltage generator is then applied to the inverting (−) input terminal to provide at the output of the operational amplifier 18 the difference between the output signal applied to the amplifier 24 and the output of the programmed voltage generator 20.

A switch S1A in the closed position shown places a resistor 64 in parallel with a resistor 66 to scale the control current to the variable load 16 for a high current output of up to 10 amps. In the open position of that switch, only the resistor 66 remains in the circuit to scale the control current for low output currents as low as 0.316 amps or less. Limiting diodes D5, D6, D7 and D8 protect the transistors Q1 and Q2 from excessive transient voltages.

The operational amplifier 24 is provided with a differential input stage, and the inverting input terminal to which the feedback potentiometer 26 is applied for voltage gain adjustment is connected to a potentiometer 68 for introducing through voltage-dividing resistors 70 and 72, and a coupling resistor 74, to provide a voltage offset for adjustment of the output of amplifier 24. The output of the amplifier 24 is applied directly to the multiplier 36 and the terminal V of the switch 38. It is also applied through a current-limiting resistor network 76 to the jack VJ for connection to the recorder. The multiplier 36 thus receives the current, I, the voltage, V, for multiplication to provide a signal proportional to power (P=IV) to a terminal of the switch 38 and through a current-limiting network 78 to a jack PJ for connection to the recorder. In that manner, two of the three outputs V, I and P may be selectively connected to a recorder for plotting the I-V characteristic of the solar array, or for plotting power points at selected or otherwise programmed output voltages of the solar array, while any one of the output signals, V, I or P may be selected through the switch 38 for direct measurement by the meter 40, or peak detection and measurement by the peak detector 45 and meter 40.

Figure 3:
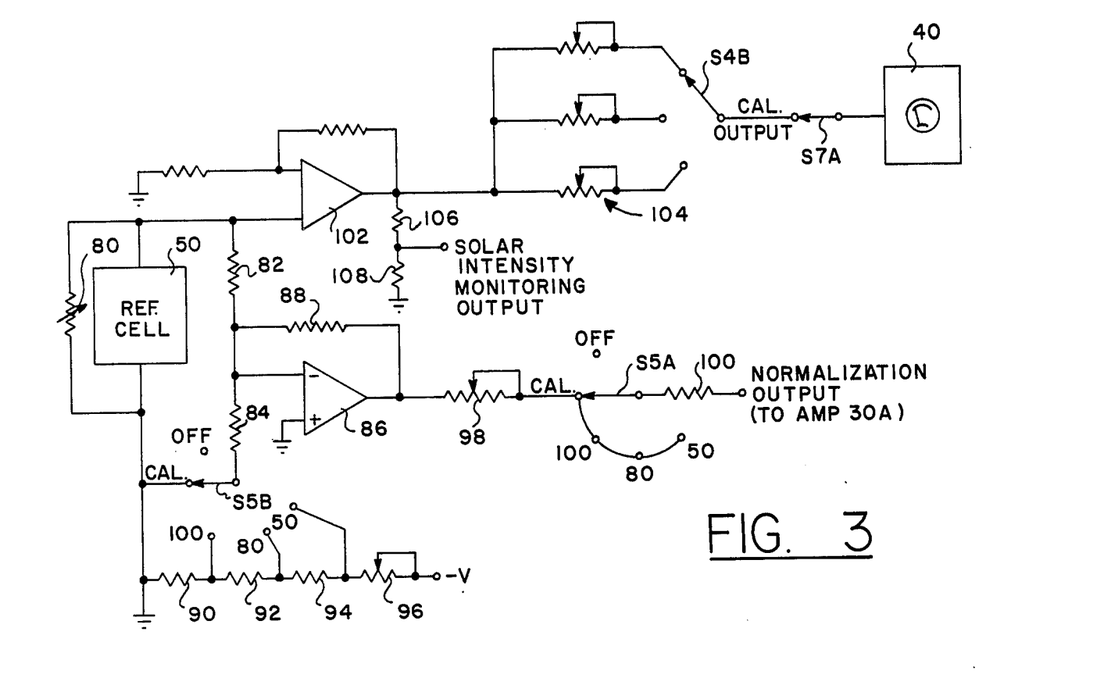
FIG. 3 is a diagram of a normalizing circuit.

An exemplary normalizing circuit is shown in FIG. 3. This circuit generates a solar array current correction which, when added to the array current (I) measured at an in situ insolation level of $S(mW/cm^2)$, results in a normalized current ($\bar{I}$) corresponding to a selected reference insolation level ($\bar{S}$) such as 100 mW/cm². The correction procedure is expressed mathematically by the following equation where the superscript s denotes parameters evaluated at the instantaneous in situ insolation level (S) and the subscript sc denotes short circuit condition:

$$\bar{I} = I^s + \underbrace{\frac{I^s_{sc}}{S}(\bar{S} - S)}_{\text{term added by normalizing circuit.}} \quad (1)$$

The exemplary normalizing circuit shown in FIG. 3 implements the term $(I^s_{sc}/S)(\bar{S}-S)$ for three user-selectable reference insolation levels ($\bar{S}$) equal to 100, 80 and 50 mW/cm². Constant voltages proportional to the negative of these values are obtained from a fixed reference voltage and voltage-dividing network consisting of resistors 90, 92 and 94. An additional resistor 96 is provided for fine adjustment of the reference voltage.

A voltage proportional to the in situ insolation level (S) is obtained from reference solar cell 50 by monitoring its short-circuit current through shunt resistor 80. A voltage proportional to $(\bar{S}-S)$ is obtained by connecting the $\bar{S}$ and S voltages to the summing junction of operational amplifier 86 via coupling resistors 82 and 84 and switch S5B.

An important feature of the correction procedure defined by Equation (1) is the fact that the term $(I^2_{sc}/s)$ is independent of the incident insolation level (S) and thus is a constant for any given solar array. The term $(I^2_{sc}/s)$ is introduced by using potentiometer 98 to appropriately scale the output of amplifier 86. The normalization output thus achieved is equal to $(I^s_{sc}/S)(\bar{S}-S)$ and is added to the measured solar array current utilizing the summing junction of amplifier 30A together with coupling resistor 100 and switch S5A.

Before the normalization circuit can be used it must be calibrated by setting potentiometer 98 equal to the value of $(I^s_{sc}/s)$ for the array under test. This is facilitated by introducing a calibrate position in ganged switch S5A-B-C. In the calibrate position switch S5C (not shown) temporarily forces the solar array under test into the condition of short circuit current through variable load 16, i.e., $I^s = I^s_{sc}$. In the same position switch S5A shorts resistor 84 to ground, thereby setting $\bar{S}$ temporarily to zero. Under these calibration conditions Equation (1) reverts to the following form.

$$\bar{I} = I^s_{sc} + \frac{I^s_{sc}}{S}(-S) \quad (2)$$

$$= 0 \text{ (if } \frac{I^s_{sc}}{S} \text{ is properly calibrated)}$$

The calibration procedure is carried out by adjusting potentiometer 98 so that the normalized current $\bar{I}$ equals zero when switch S5 is in the calibrate position.

To allow the incident insolation level denoted by parameter S to also be monitored an operational amplifier 102 is employed to couple that parameter to the meter 40 through a switch S7A when that switch is closed as shown, and a switch S4B which selects 1 of a plurality of calibration potentiometers 104 for measurement ranges of 31.6, 100 and 316 mW/cm². The adjustments of those potentiometers are made under laboratory conditions. The output of the amplifier 102 is also coupled to a solar intensity monitoring output by current-limiting resistors 106 and 108.

The result of using the normalizing circuit during array measurements is normalization of the output of the solar array to a known solar intensity so that if the instrument is used on a given day when the insolation level is only 83 milliwatts per square centimeter, for example, the instrument may be adjusted to compare the output of the array to some measurement that was made when the solar array was new and under some known reference solar intensity, such as 100 milliwatts per square centimeter, or for the particular solar insolation conditions of that day at some lower reference such as 80 or 50 milliwatts per square centimeter.

This normalization is accomplished automatically once calibration adjustments are made and applies to all subsequent current measurements of the array. So by measuring the solar intensity in the field on a given day, and then effectively forcing the solar intensity to be 100% of standard, the circuit 52 will automatically provide normalization. Then if for any reason the sun intensity varies during measurement, such as might result from a cloud passing, or even a bird flying over the solar cell, the normalizing circuit continuously measures the output of the sun and adjusts in real time any variation of the current input from the solar array to the operational amplifier 30A to maintain normalization to 100 mW/cm², or whatever was established as the standard in the laboratory. In that manner, the normalizing circuit will compensate for variations in solar intensity incident on the solar array while the output of the solar array is being checked so that if it is "83" in one instant and "85" in the next instant, then "81" in a following instant, the output of the operational amplifier 30B is constantly normalized to "100" regardless of what variations may be occurring in the solar intensity incident on the array during the time of measurement.

The normalized current output of the operational amplifier 30B is the current experienced in real time plus some correction value from the normalizing circuit 52 where this correction value is a function of the measured solar intensity through the reference cell, which is the value S while the field measurements of the solar array 12 are being made. The value $\bar{S}$ is a reference intensity set in an initial calibration when the meter is first connected to the array, but with a switch S5B in the calibrate position. The potentiometer 98 is then set to adjust the meter 40 to read zero as the measurement of current. That essentially sets within potentiometer 98 the value for the constant $(I_{sc}(s)/S)$. The quantity $\bar{S}-S$ may thereafter constantly change as the solar intensity of the sun on the array 12 and reference cell 50 changes, where S is nothing more than the solar intensity measurement by the reference cell and $\bar{S}$ is a standard solar intensity for normalization. The term $I_{sc}$ in this constant indicates that calibration of the normalizing circuit is made under short circuit conditions of the solar array 12, that is to say, while the variable load 16 is virtually zero and the switch S1D is in the position shown. Since the short circuit current $I_{sc}$ is always proportional to S, if the short circuit current $I_{sc}$ is then divided by S, the result will be a constant independent of S. Therefore, once this constant has been manually adjusted at any given time, such as at the beginning of measurements on the solar array, the only part of the expression for the output of the normalizing circuit is the term $\bar{S}-S$, which is the only term that has to be dynamically changed during the measurement, and which is automatically changed dynamically by the normalizing circuit. During calibration $\bar{S}$ is simply set to zero by the switch S5B, and during operation set to 100, 80 or 50. Once the switch S5B is set to 100, 80 or 50 mW/cm², the zeroing adjustment of the potentiometer 98 will provide normalization of the solar intensity current measurements provided to the meter, the multiplier and the recorder.

Figure 4:
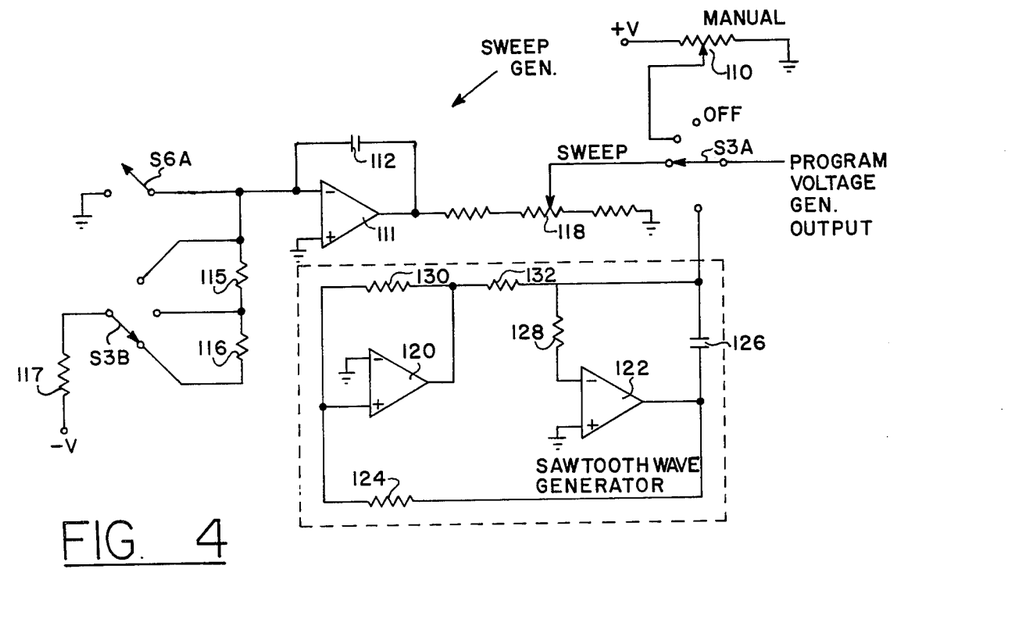
FIG. 4 is a circuit diagram of a program voltage generator.

During operation, the program voltage generator 20 may provide a manually-adjusted voltage, V, through a potentiometer 110 shown in FIG. 4 which illustrates an exemplary circuit diagram for the program voltage generator. The switch S3A is set to the manual position while the program voltage is thus being manually set. The switch 38 is set to the V output terminal in order to observe the manually-set voltage. Once the desired voltage has been manually set, the switch 38 may be set to the P or I terminals to measure the power or current produced by the solar array for the particular voltage set. That is useful in checking out and analyzing any problems present in the array, but what is more useful is to generate a ramp signal which will sweep the program voltage from virtually zero to a maximum value at a constant rate over a period of about 10 seconds, in order to record the output current, I, or the output power, P, as a function of voltage, V. The sweep generator required for that purpose in the program voltage generator is comprised of an operational amplifier 111, shown in FIG. 4, arranged as an integrator with feedback capacitor 112 and input resistor network connected to −V comprised of resistors 115 through 117. A switch S6A is normally closed to short out capacitor 112 so that the sweep begins at zero voltage corresponding to the array short circuit condition. Once the switch S6A is opened to initiate a sweep, the input terminal of the operational amplifier 111 is connected to the negative voltage source to commence charging the capacitor 112 and thus drive the output terminal of the operational amplifier from an initial zero voltage to a predetermined level at a rate which depends upon whether or not any of the resistors 115 and 116 are in the input resistance network as selected by a switch S3B used to select three sweep voltage rates. The exact rate of increase is adjusted by a potentiometer 118. Once the sweep has been completed, the switch S6A is closed to drive the programmed voltage generator output back to zero.

In some instances it is desirable to have a sweep generator which quickly and repeatedly drives the program voltage generator output back and forth between high and low limits, as when using the peak detector 45 with the meter 40. That is accomplished by two operational amplifiers 120 and 122 with regenerative feedback through a resistor 124 from the output of the amplifier 122 to the input of the amplifier 120 and degenerative feedback from the output of the amplifier 122 to the inverting input terminal thereof through a capacitor 126 and a resistor 128. The operational amplifier 120 has direct regenerative feedback through a resistor 130 in order to continually try to drive the operational amplifier 122 through a resistor 132 in a positive direction while the feedback circuit of the operational amplifier 122 continually tries to drive the positive input terminal of the amplifier 120 in a negative direction. The result is a sawtooth waveform with positive slopes substantially equal to the negative slopes. Other cyclical waveform generators could be used such as a sinusoidal waveform generator.

Although particular embodiments of the invention have been described and illustrated herein, it is recognized that modifications and equivalents may readily occur to those skilled in the art and consequently it is intended that the claims be interpreted to cover such modifications and equivalents.

What is claimed is:

1. Apparatus for recording the voltage and current output of a solar array comprising
   signal-controlled means for producing a variable load across a solar array and a current-sensing element in series with said variable load across said array for sensing current through said variable load,
   feedback control means for sensing the voltage output across said array and sensing element in series, and for stabilizing the voltage output across the variable load for a desired voltage output, said feedback control means including means for summing a control signal with the voltage output,
   means for generating said control signal, thereby to program said voltage output, and
   means connected to said current sensing element and to said feedback control means for recording the current sensed through said load as a function of voltage output.

2. Apparatus as defined in claim 1 including a reference solar cell and normalizing means connected to said cell and said current-sensing element for scaling the current to be recorded as a function of voltage output of said array so as to provide a normalized current that corresponds to the array voltage output at a reference level of insolation from solar radiation, whereby all current measurements are continuously normalized to the reference insolation level.

3. Apparatus as defined in claim 2 including electronic multiplying means connected to receive said voltage output and said normalized current for producing a power output signal, means for measuring said voltage output, normalized current or power output signal and switching means for selectively connecting said measuring means to receive one of said voltage output, normalized current and power output signal for measurement.

4. Apparatus as defined in claim 3 wherein said measuring means includes peak detecting means.

5. Apparatus as defined in claim 4 wherein said measuring means includes switching means for selectively bypassing said peak detecting means in making measurements.

6. Apparatus as defined in claim 5 wherein said means for generating said control signal includes a ramp signal generating means, a cyclic wave generating means, and a manually-adjustable static signal generating means, and switching means for selecting as the control signal the output of the ramp signal generating means, cyclic wave generating means or static signal generating means.

7. A portable instrument for measuring the voltage, current and power parameters of a photovoltaic solar array comprising
   a variable load connected across said array and regulated by electronic feedback means in response to a voltage-output signal of said array, thereby to control the voltage and current output of the array over the full range from substantially short circuit current to open circuit,
   current sensing means connected in series with said variable load for sensing current through said load and producing a proportionate load current signal,
   multiplying means connected to said feedback means and to said current sensing means for providing a power output signal that is the product of said voltage output across said load as regulated by said feedback means and said load current signal, signal measuring means, and parameter selecting means for selectively connecting said voltage output signal, said load current signal and said power output signal to said meter for measurement.

8. Apparatus as defined in claim 7 including peak-detecting means, and switching means for selectively connecting said peak-detecting means in series between said parameter-selecting means and said signal-measuring means.

9. Apparatus as defined in claim 8 including means for generating a programmed output voltage control signal and means for adding said programmed output voltage control signal to said voltage output signal in said electronic feedback means for programmed control of said voltage output.

10. Apparatus for measuring on a meter the voltage, current, and power parameters of a photovoltaic solar array under sunlight operating conditions comprising a variable load connected across said array, a voltage regulator which responds to the difference between the output voltage of said array and a programmed test control voltage for control of voltage output across said load, means for selectively generating said control voltage as a single ramp voltage at a low rate for measuring power or current as a function of voltage from zero to a maximum voltage output, a repeated ramp voltage at a high rate for peak output power or current measurements, or a DC voltage for power or current measurements at selected voltage output points, a reference photovoltaic solar cell, a current sensing element connected in series with said variable load, means for comparing the output current of said sensing element with the output current of said reference solar cell to provide a normalizing signal, means for adding said normalizing signal to the signal from said current-sensing element in order to provide normalized array current as a function of array voltage output, multiplying means for multiplying the array voltage output and normalized current to provide a measurement of power, switching means for selectively connecting the power, normalized current, or voltage output to said meter, and means for selectively connecting a peak detector in series with the selected signal input to said meter for peak measurements.

11. Apparatus as defined in claim 10 including means for recording any of the three parameters of power, current and voltage that can be measured.

12. Apparatus as defined in claim 11 wherein said recording means plots one parameter as a function of another.

* * * * *

UNITED STATES PATENT AND TRADEMARK OFFICE
CERTIFICATE OF CORRECTION

PATENT NO. : 4,163,194

DATED : July 31, 1979

INVENTOR(S) : Ronald G. Ross

It is certified that error appears in the above-identified patent and that said Letters Patent are hereby corrected as shown below:

Column 3, line 32, change "insolution" to -- insolation --

Column 4, line 39, change "V~0.6" to -- V≈0.6 --

Column 8, line 61, change "S-S" to -- $\overline{S}$-S --

Signed and Sealed this

Thirteenth Day of November 1979

[SEAL]

Attest:

RUTH C. MASON
Attesting Officer

LUTRELLE F. PARKER
Acting Commissioner of Patents and Trademarks